(12) United States Patent
Segawa

(10) Patent No.: US 8,164,798 B2
(45) Date of Patent: Apr. 24, 2012

(54) IMAGE PROCESSING APPARATUS AND METHOD FOR PRINTING AND PLATE MAKING, AND RECORDING MEDIUM HAVING IMAGE PROCESSING PROGRAM RECORDED THEREIN FOR PRINTING AND PLATE MAKING

(75) Inventor: Hiroyuki Segawa, Kyoto (JP)

(73) Assignee: Dainippon Screen MFG Co., Ltd., Kyoto (JP)

( * ) Notice: Subject to any disclaimer, the term of this patent is extended or adjusted under 35 U.S.C. 154(b) by 779 days.

(21) Appl. No.: 11/987,705

(22) Filed: Dec. 4, 2007

(65) Prior Publication Data

US 2008/0158614 A1    Jul. 3, 2008

(30) Foreign Application Priority Data

Dec. 27, 2006 (JP) .............. P2006-352243

(51) Int. Cl.
*H04N 1/40* (2006.01)
(52) U.S. Cl. ................. 358/3.27; 358/3.15
(58) Field of Classification Search ........... 358/1.9, 358/2.1, 1.18, 3.13, 3.15, 3.27; 347/43
See application file for complete search history.

(56) References Cited

U.S. PATENT DOCUMENTS

| | | | | |
|---|---|---|---|---|
| 5,581,667 A * | 12/1996 | Bloomberg | ............ | 358/1.9 |
| 5,613,046 A * | 3/1997 | Dermer | ............ | 358/1.9 |
| 6,366,361 B1 * | 4/2002 | Dermer et al. | ............ | 358/1.9 |
| 6,378,983 B1 | 4/2002 | Ito et al. | | |
| 7,391,536 B2 * | 6/2008 | McElvain | ............ | 358/1.9 |
| 2003/0048475 A1 | 3/2003 | Watanabe | | |

FOREIGN PATENT DOCUMENTS

| | | |
|---|---|---|
| EP | 0 445 066 A2 | 9/1991 |
| EP | 0 996 281 A2 | 4/2000 |
| JP | 2000-165694 | 6/2000 |
| JP | 2004-34636 | 2/2004 |
| JP | 2004-122692 | 4/2004 |
| JP | 2004-155001 | 6/2004 |
| JP | 2006-5481 | 1/2006 |
| JP | 2006-129007 | 5/2006 |
| JP | 2006-202198 | 8/2006 |

OTHER PUBLICATIONS

European Search Report issued in European Patent Application No. 07121519.8-1228, mailed Feb. 23, 2011.
Adobe System Inc: "Postscript Language Reference third edition", Internet Citation, Feb. 1999, pp. 435-453, XP002474593, retrieved from the Internet: URL:http://www.adobe.com/products/postscript/pdfs/PLRM.pdf on Apr. 1, 2008.

* cited by examiner

*Primary Examiner* — Thomas D Lee
*Assistant Examiner* — Stephen M Brinich
(74) *Attorney, Agent, or Firm* — McDermott Will & Emery LLP

(57) ABSTRACT

A neighboring vector, which is a boundary portion between two overlapping objects, is extracted. To calculate luminance levels of the objects on both sides of the neighboring vector, a predetermined number of coordinate points (sample points) in the vicinity of the neighboring vector are extracted at least from the image side. A rendering process is performed on an area including all the extracted sample points to acquire color values at the sample points. The luminance level of the image is calculated based on the acquired color values, and the luminance levels of the objects on both sides of the neighboring vector are compared to each other to determine the position (direction) in which to generate a trap graphic.

14 Claims, 17 Drawing Sheets

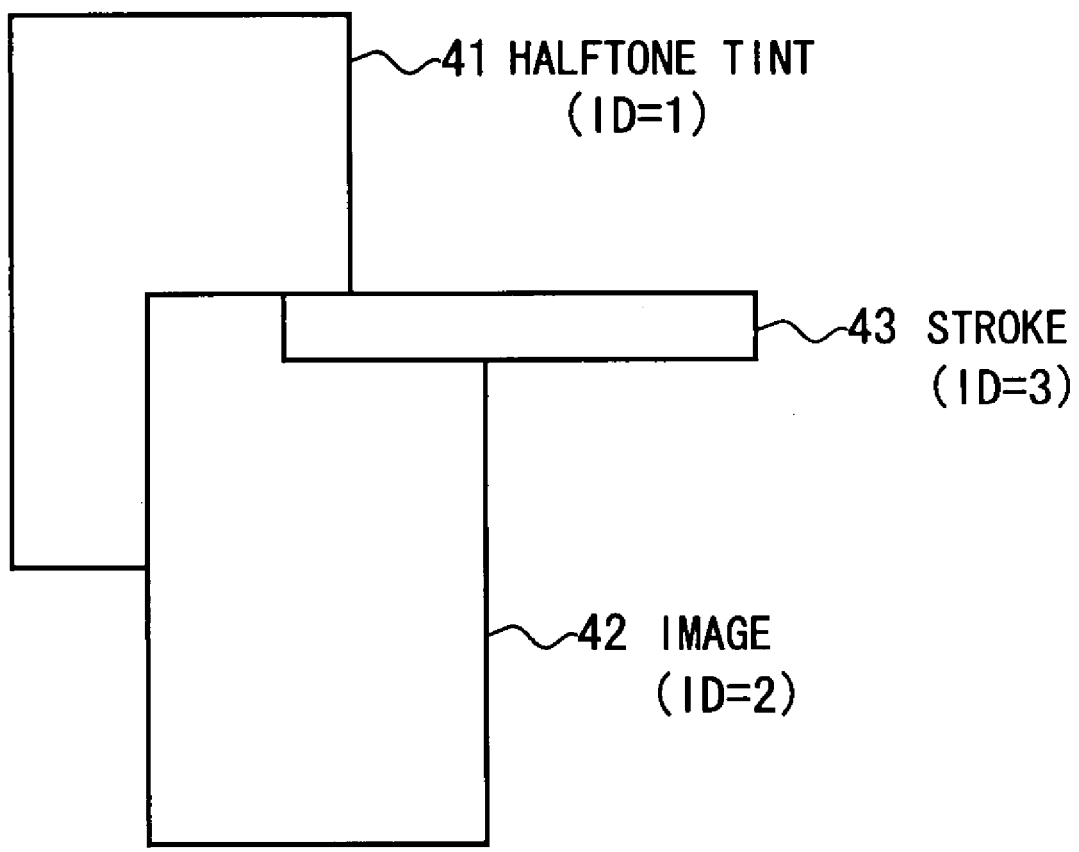

47 IMAGE
48 CHARACTERS

47 IMAGE
49 NEIGHBORING VECTOR
48 CHARACTERS

Fig.15A TEL01

Fig.15B TEL01

Fig.15C TEL01

IMAGE PROCESSING APPARATUS AND METHOD FOR PRINTING AND PLATE MAKING, AND RECORDING MEDIUM HAVING IMAGE PROCESSING PROGRAM RECORDED THEREIN FOR PRINTING AND PLATE MAKING

BACKGROUND OF THE INVENTION

1. Field of the Invention

The present invention relates to image processing apparatuses and methods for printing and plate making, and more specifically to technology for trapping between objects including image objects (data).

2. Description of the Background Art

In the field of printing and plate making, a personal computer or such like is used to first perform an edit process based on characters that are to be contained in a print and a plurality of types of other print elements, such as logos, patterns, and illustrations, and generate page data containing a print target written in a page-description language. Thereafter, a RIP process is performed on the page data to generate image data for use in production of a plate (a press plate) that is to be placed in a printing machine.

Incidentally, in the case of multicolor printing, in order to prevent an underlying portion from being exposed at a boundary between colors due to misregistration, a trapping process is performed before the performance of the RIP process on the page data. The trapping process is to dispose, along a boundary portion between two adjacent colors on an image, a hairline graphic (hereinafter, referred to as a "trap graphic") which has a color containing color elements from both sides of the boundary portion. For example, in the case where a Y color halftone tint object 71, a C color halftone tint object 72, and an M color halftone tint object 73 are located so as to overlap with each other as shown in FIG. 16A, for example, the trapping process generates trap graphics 74 to 76 in boundary portions between the overlapping objects as shown in FIG. 16B. As a result, any underlying portion is prevented from being exposed in boundary portions between colors due to misregistration in the case of multicolor printing.

In the above-described trapping process for objects with colored line drawing such as halftone tints, strokes and characters (such objects, for which a plurality of colorplates are used, are referred to hereinafter as "color objects"), a value (a luminance level) that represents brightness is calculated for each color object, and thereafter the trap graphic is generated on a color object at a lower luminance level, i.e., a relatively dark-colored object. This makes the trap graphic less noticeable, preventing image quality from being reduced by the trapping process.

On the other hand, in the trapping process between image objects (hereinafter simply referred to as "images") or between an image and a color object, the luminance level of each image varies from one pixel to another, and therefore the side on which a trap graphic is to be generated (hereinafter, referred to as a "trap direction") cannot be determined from among the two objects according to the luminance levels. Thus, for example, the trap direction is determined according to a trap rule designated by the user from among preset trap rules (rules for automatically determining the trap direction).

Examples of the trap rules between the image and the color object include "no trap graphic", "increase in area of color object relative to image", "decrease in area of color object relative to image", "centering", etc. Note that each of the trap rules can be designated per (color object) type, such as halftone tint, stroke, or character (e.g., "the halftone tint can be increased in area relative to the image"). In addition, examples of the trap rules between images include "no trap graphic", "increase in area of top (front) image relative to bottom (back) image", "decrease in area of top (front) image relative to bottom (back) image", "centering", etc.

Trap graphics generated according to the trap rules will be described with reference to FIGS. 17A to 17D. Note that FIGS. 17A to 17D provide illustrations based on the assumption that an image 81 and a color object (here, a halftone tint) 82 are disposed so as to be a bottom (back) image and a top (front) image, respectively. In the case where "no trap graphic" is designated from among the above-described trap rules, no trap graphic is generated as shown in FIG. 17A. In the case where "increase in area of color object relative to image" is designated, a trap graphic 83 is generated on the image 81 as shown in FIG. 17B. In the case where "decrease in area of color object relative to image" is designated, a trap graphic 84 is generated on the color object 82 as shown in FIG. 17C. In the case where "centering" is designated, a trap graphic 85 is generated centering around the boundary between the image 81 and the color object 82 as shown in FIG. 17D.

Note that the following techniques have been disclosed in relation to the trapping process. Japanese Laid-Open Patent Publication No. 2004-34636 discloses a technique related to a trapping process for use in the case where black characters overlap a design. Japanese Laid-Open Patent Publication No. 2006-5481 discloses a technique for predicting a direction in which a plate significantly deviates, and setting a wide trap width in that direction. Japanese Laid-Open Patent Publication No. 2004-122692 discloses a technique for changing the size of a trap area depending on printing methods. Japanese Laid-Open Patent Publication No. 2001-129986 discloses a technique for eliminating variations between printing and proofing in terms of the accuracy of trapping and the degree of garbling. Japanese Laid-Open Patent Publication No. 2003-87548 discloses a technique related to a trapping process for a document with a plurality of pages. Japanese Laid-Open Patent Publication No. 2004-155001 discloses a technique related to a trapping process between graphics. Japanese Laid-Open Patent Publication No. 2006-202198 discloses a technique for speeding up a trapping process. Japanese Laid-Open Patent Publication No. 2006-129007 discloses a technique for speeding up a trapping process using an object-type-information bitmap, and a processing parameter per object, as well as allowing the user to readily designate a trapping parameter.

However, when the trapping process is automatically carried out between images or between an image and a color object according to the above-described trap rules, a trap graphic might be generated in an undesirable direction. Such a case will be described with reference to FIGS. 18A and 18B, as well as FIGS. 19A and 19B. Note that in FIGS. 18A, 18B, 19A, and 19B, for ease of explanation, the trap graphic is depicted in bold and dark color.

The first assumption is that relatively dark color objects (a halftone tint, 92 and characters 93) are disposed on (in front of) a relatively bright image 91 prior to the trapping process as shown in FIG. 18A. In this case, if the trap rule "increase in area of color object relative to image" is designated, the trapping process produces a result as shown in FIG. 18B. Specifically, a trap graphic is generated in an undesirable direction, so that the trap graphic is significantly noticeable.

The next assumption is that relatively bright color objects (a halftone tint 95 and characters 96) are disposed on (in front of) a relatively dark image 94 prior to the trapping process as shown in FIG. 19A. In this case, if the trap rule "decrease in area of color object relative to image" is designated, the trapping process produces a result as shown in FIG. 19B. Specifically, a trap graphic is generated in an undesirable direction, so that the halftone tint and the characters are unclear.

In addition, when the data as shown in FIG. 18A and the data as shown in FIG. 19A coexist within a single page, the conventional trap rules do not "allow a trap graphic to be generated in a desirable direction for all objects".

As described above, when the trapping process is automatically carried out between objects including an image, a trap graphic might not be generated in a desirable direction, leading to a reduction in image quality. In addition, the user is required to manually correct any portion in which the trap graphic is generated in an undesirable direction, leading to a reduction in working efficiency.

SUMMARY OF THE INVENTION

Therefore, an object of the present invention is to provide an image processing apparatus and an image processing method that are capable of automatically generating a trap graphic in a desirable direction between an image and a color object or between images, without requiring the user's manual operation.

The present invention has the following features to attain the above object.

One aspect of the present invention is directed to an image processing apparatus for reading print data containing a plurality of objects including image objects each having one or more colors and color objects each having one color, and generating a trap graphic along a neighboring vector, which is a boundary portion between any two overlapping objects from among the plurality of objects, the boundary portion being included in a contour of one of the two overlapping objects that is disposed on top of the other object, the apparatus comprising:

a sample coordinate extraction portion for extracting coordinate points in the vicinity of the neighboring vector as sample coordinate points from among all coordinate points at which the image object is rendered, wherein at least one of the two overlapping objects is an image object;

a color value acquisition portion for acquiring color values representing colors at the sample coordinate points; and a trap graphic generation position (TGGP) determination portion for determining a position in which to generate the trap graphic with reference to the neighboring vector, based on the color values at the sample coordinate points acquired by the color value acquisition portion.

The image processing apparatus thus configured includes: the sample coordinate extraction portion for extracting coordinate points in the vicinity of a neighboring vector, which is a boundary portion between objects, as sample coordinate points; the color value acquisition portion for acquiring color values at the extracted sample coordinate points; and the TGGP determination portion for determining a trap direction based on the color values at the sample coordinate points. Accordingly, even if one of two overlapping objects is an image object, the trap direction can be determined based on the color values at the sample coordinate points in the vicinity of the neighboring vector. Therefore, when generating a trap graphic between image objects or between an image object and a color object, the trap direction is determined based on brightness of the two objects in the vicinity of the neighboring vector. Thus, even if the image object contains color objects with various levels of brightness, it is possible to generate the trap graphic in a desirable trap direction between the objects.

In the apparatus as configured above, the color value acquisition portion preferably acquires the color values at the sample coordinate points by rendering a rectangular area in the smallest possible size, the rectangular area containing all the sample coordinate points extracted by the sample coordinate extraction portion.

According to this configuration, a rendering process is performed only on the smallest possible rectangular area including all the sample coordinate points to acquire the color values at the sample coordinate points. Thus, it is possible to prevent increase of processing time for a trapping process.

In the apparatus as configured above, the sample coordinate extraction portion preferably extracts a predetermined number of coordinate points from among all coordinate points on the neighboring vector as reference coordinate points for sample coordinate extraction, which are referenced for extracting the sample coordinate points, and the sample coordinate extraction portion preferably also extracts predetermined points as the sample coordinate points, the predetermined points being present on a line that is perpendicular to the neighboring vector and extends through the reference coordinate points for sample coordinate extraction.

According to this configuration, a predetermined number of coordinate points on the neighboring vector are extracted for sample coordinate extraction. Accordingly, coordinate points to be referenced for sample coordinate extraction can be extracted based on the entire length of the neighboring vector and lengths of line segments constituting the neighboring vector. Thus, coordinate points used for obtaining average brightness of each object in the vicinity of the neighboring vector can be suitably and readily extracted.

In the apparatus as configured above, it is preferable that the TGGP determination portion calculates luminance levels of the image objects based on the color values at the sample coordinate points acquired by the color value acquisition portion, and determines the position in which to generate the trap graphic with reference to the neighboring vector, such that the trap graphic is generated on one of the two overlapping objects that has a lower luminance level.

According to this configuration, luminance levels of two objects are compared to each other to generate a trap graphic on an object with a lower luminance level. Thus, it is possible to generate a trap graphic on a darker one of two objects including an image without requiring the user's manual operation.

Preferably, the apparatus as configured above further includes a selection portion for externally selecting whether to determine the position in which to generate the trap graphic per character or per character string when one of the two overlapping objects is a color object including a character string consisting of a plurality of characters, wherein, for the character string consisting of the plurality of characters, the TGGP determination portion determines the position in which to generate the trap graphic per character when the selection portion selects a determination per character, and wherein, for the character string consisting of the plurality of characters, the TGGP determination portion determines the position in which to generate the trap graphic when the selection portion selects a determination per character string, such that a relative positional relationship between the neighboring vector and the trap graphic is identical among all the plurality of characters.

According to this configuration, the user can select whether to determine the trap direction per character or per character string when generating a trap graphic between an image object and a color object including the character string. Thus, through the selection by the user, it is possible to set the same trap direction for all characters in the character string.

Another aspect of the present invention is directed to a computer-readable recording medium having recorded therein an image processing program for use with an image processing apparatus for reading print data containing a plurality of objects including image objects each having one or more colors and color objects each having one color, and generating a trap graphic along a neighboring vector, which is a boundary portion between any two overlapping objects from among the plurality of objects, the boundary portion being included in a contour of one of the two overlapping objects that is disposed on top of the other object, the program causing the apparatus to execute the following steps:

a sample coordinate extraction step for extracting coordinate points in the vicinity of the neighboring vector as sample coordinate points from among all coordinate points at which the image object is rendered, wherein at least one of the two overlapping objects is an image object;

a color value acquisition step for acquiring color values representing colors at the sample coordinate points; and a TGGP determination step for determining a position in which to generate the trap graphic with reference to the neighboring vector, based on the color values at the sample coordinate points acquired by the color value acquisition step.

Still another aspect of the present invention is directed to an image processing method for reading print data containing a plurality of objects including image objects each having one or more colors and color objects each having one color, and generating a trap graphic along a neighboring vector, which is a boundary portion between any two overlapping objects from among the plurality of objects, the boundary portion being included in a contour of one of the two overlapping objects that is disposed on top of the other object, the method comprising:

a sample coordinate extraction step for extracting coordinate points in the vicinity of the neighboring vector as sample coordinate points from among all coordinate points at which the image object is rendered, wherein at least one of the two overlapping objects is an image object;

a color value acquisition step for acquiring color values representing colors at the sample coordinate points; and a TGGP determination step for determining a position in which to generate the trap graphic with reference to the neighboring vector, based on the color values at the sample coordinate points acquired by the color value acquisition step.

These and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a diagram for describing ID assignment in the embodiment.

FIGS. 5A to 5C are diagrams for describing an ID rendering process in the embodiment.

FIGS. 15A to 15C are diagrams for describing trap direction determination per character string in a variant of the embodiment.

DESCRIPTION OF THE PREFERRED EMBODIMENTS

Hereinafter, an embodiment of the present invention will be described with reference to the accompanying drawings.

<1. Hardware Configuration of the Image Processing Apparatus>

Figure 1:
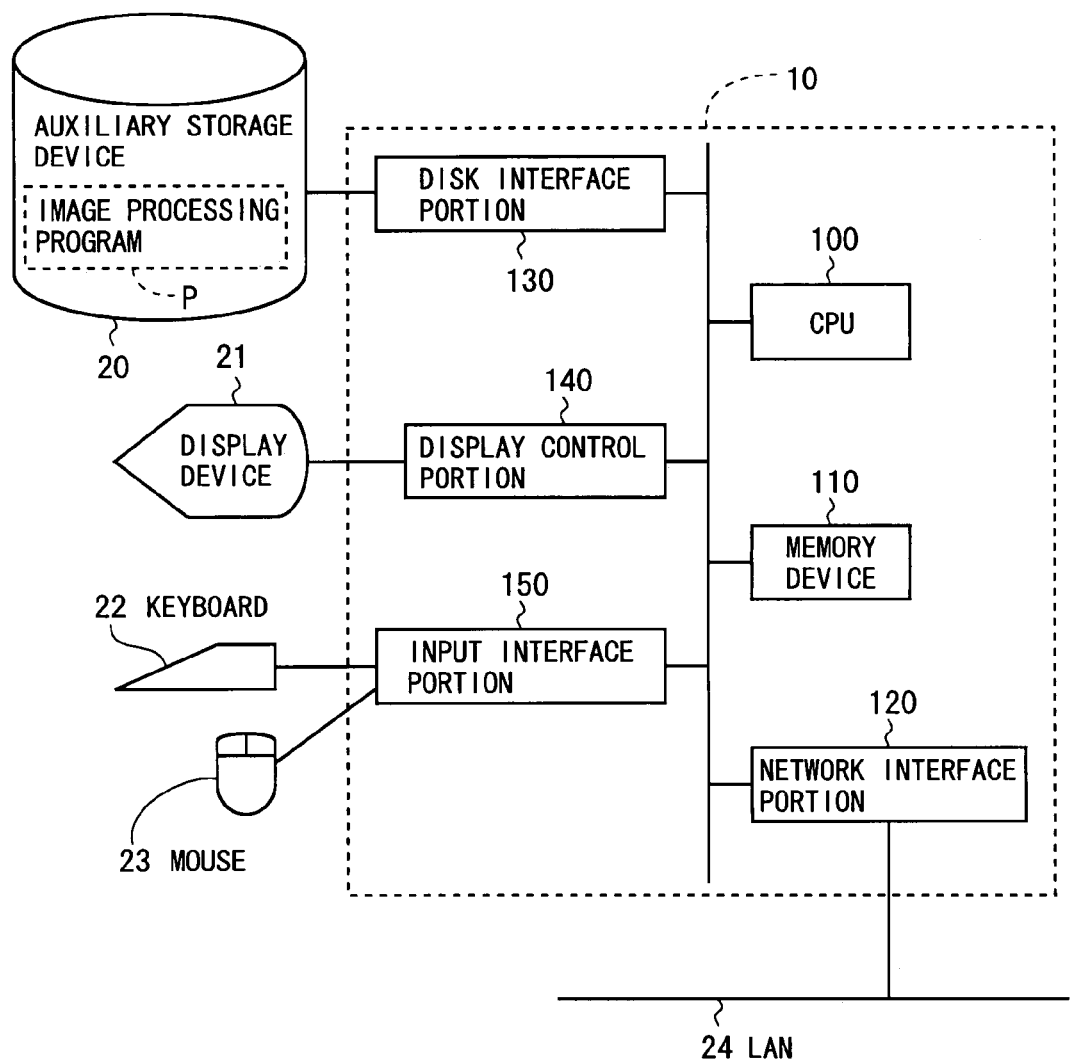
FIG. 1 is a block diagram illustrating a hardware configuration of an image processing apparatus according to an embodiment of the present invention.

FIG. 1 is a block diagram illustrating a hardware configuration of an image processing apparatus according to an embodiment of the present invention. The image processing apparatus is implemented by a PC (personal computer), and includes a main unit 10, an auxiliary storage device 20, a display device 21 such as a CRT, and input devices such as a keyboard 22 and a mouse 23. The main unit 10 of the PC includes a CPU 100, a memory device 110 such as a RAM or a ROM, a network interface portion 120, a disk interface portion 130, a display control portion 140, and an input interface portion 150. The disk interface portion 130 is connected to the auxiliary storage device 20. The display control portion 140 is connected to the display device 21. The input interface portion 150 is connected to the input devices. In addition, the image processing apparatus is connected to a LAN 24 via the network interface portion 120.

A program P for image processing (hereinafter, referred to as an "image processing program") is stored in the auxiliary storage device 20, and when the image processing apparatus is activated, the image processing program P is loaded into the memory device 110 via the disk interface portion 130. Then, the CPU 100 executes the image processing program P to implement image processing for a trapping process. Note that the image processing program P is provided, for example, through a computer-readable recording medium, such as a CD-ROM, which has the program recorded therein. Specifically, after purchasing a CD-ROM as a recording medium containing the image processing program P, the user installs the image processing program P into the auxiliary storage device 20 by inserting the CD-ROM into a CD-ROM drive unit to cause the CD-ROM drive unit to read the image processing program P from the CD-ROM. Alternatively, the image processing program P may be received via the LAN 24, and installed into the auxiliary storage device 20.

<2. General Outline of the Trapping Process Between Objects Including an Image>

Described next is the general outline of the trapping process between objects including an image in the present embodiment. In the present embodiment, first, a neighboring vector between the objects is extracted. The neighboring vector as used herein refers to a reference line for determining a position in which to generate a trap graphic. The reference line is a portion of one of two overlapping objects that is disposed below (behind) the other object (i.e., the top (front) object) and the portion is a part of the contour of the top (front) object. After the neighboring vector is extracted, coordinate points (sample coordinate points), which are used as samples for calculating brightness of the objects, are extracted in order to compare the brightness of one object bordered by the neighboring vector to the brightness of the other object. Then, luminance levels of the image objects are calculated based on color values at the extracted coordinate points, and compared to each other to determine a trap direction. Note that the color value refers to a ratio of halftone dot areas per unit area among plates used for printing (C plate, M plate, Y plate, and K plate), and the color value is expressed in percentage, and also referred to as a "dot percentage", or a "tone values".

Figure 2A:
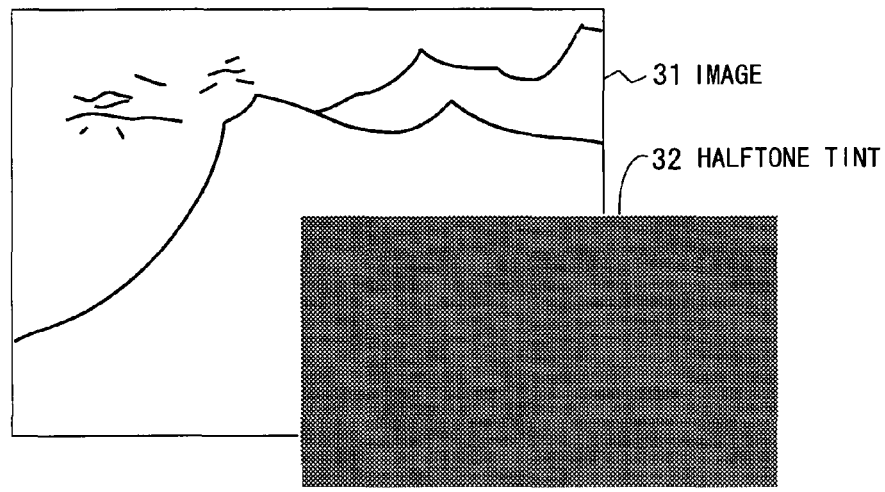
FIGS. 2A to 2C are diagrams for describing the general outline of a trapping process between objects including an image in the embodiment.
Figure 2B:
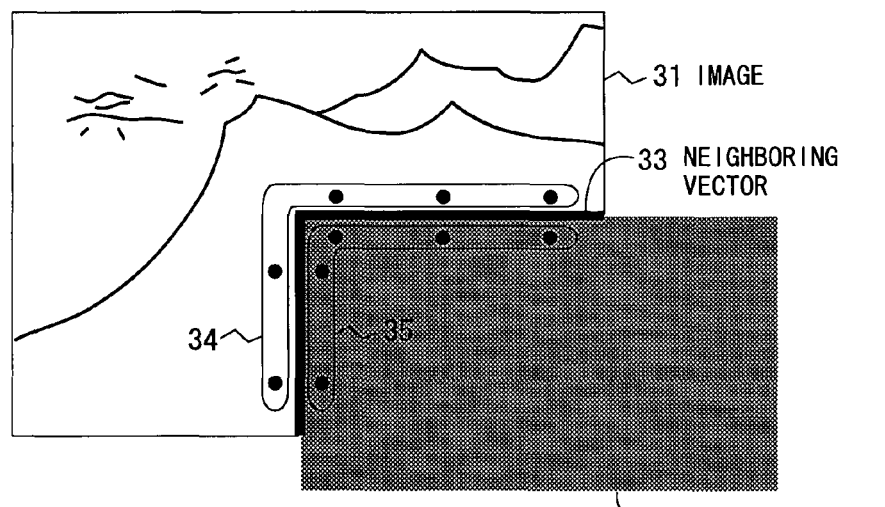
Figure 2C:
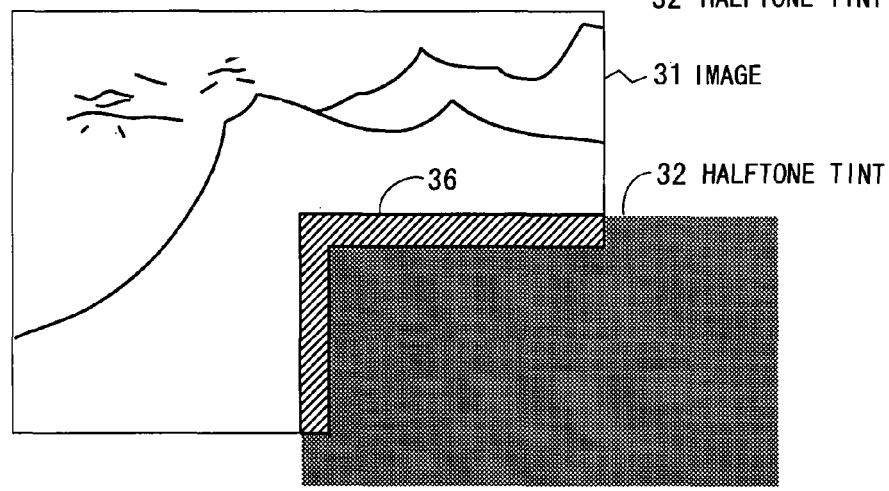

The following description is given on the assumption that a halftone tint 32 is disposed as a color object on an image 31 as shown in FIG. 2A. In this case, the boundary between the image 31 and the halftone tint 32 is first extracted as a neighboring vector 33 as shown in FIG. 2B. Thereafter, sample coordinate points 34 on the image 31 side and sample coordinate points 35 on the halftone tint 32 side are extracted. Luminance levels of the two objects are calculated, and thereafter compared to each other to determine a trap direction, so that a trap graphic 36 is generated as shown in FIG. 2C. As for the color object (here, the halftone tint 32), it is possible to acquire the luminance level based on the attributes of the color object, and therefore it is not necessary to extract the sample coordinate points 35 and calculate the luminance level.

<3. Procedure of Image Processing for the Trapping Process>

Figure 3:
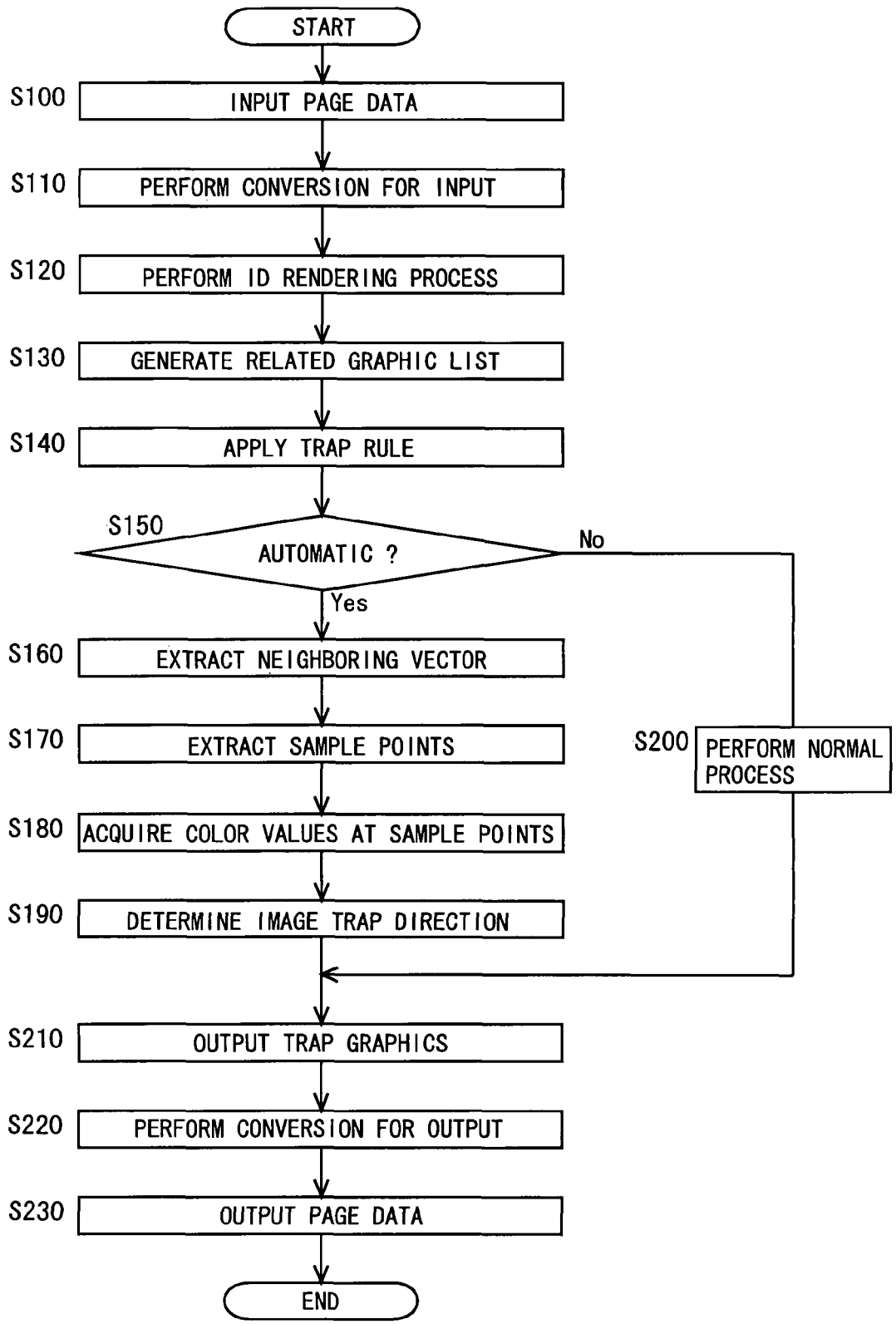
FIG. 3 is a flowchart illustrating the overall procedure of image processing for the trapping process in the embodiment.

FIG. 3 is a flowchart illustrating the procedure of image processing for the trapping process in the present embodiment. In the present embodiment, page data containing a print target written in a page-description language is stored to the auxiliary storage device 20 as a file, and thereafter the image processing program P is activated through operation by the operator. Hereinbelow, the operation of the CPU 100 will be described.

The CPU 100 first loads page data, which is written in a page-description language in the format of, for example, PostScript (registered trademark of Adobe Systems Incorporated) or PDF (Portable Document Format), from the auxiliary storage device 20 to the memory 110 (step S100). Then, depending on the format of the loaded page data, the data is internally converted to a format that can be handled by the image processing program P according to the present embodiment (step S110).

After the internal conversion of the data, a process (hereinafter, referred to as an "ID rendering process") is performed for correlating each pixel within a display area with an object that is to be displayed by the pixel (step S120). By the ID rendering process, each object is assigned a unique identification number (hereinafter, referred to as "ID"). For example, in the case where n objects are present within a page, the objects are assigned IDs "1", "2", ..., "n" in order from bottom (back) to top (front). Where the objects are disposed in the order as shown in FIG. 4, from bottom (back) to top (front): a halftone tint 41, an image 42, and a stroke 43, the halftone tint 41, the image 42, and the stroke 43 are assigned "1", "2", and "3", respectively. After the objects are assigned their IDs, ID rendering is performed on the pixels sequentially from the object with the lowest ID (the object disposed at the bottom) to the object with the highest ID (the object disposed at the top).

Figures 5A, 5B, 5C:
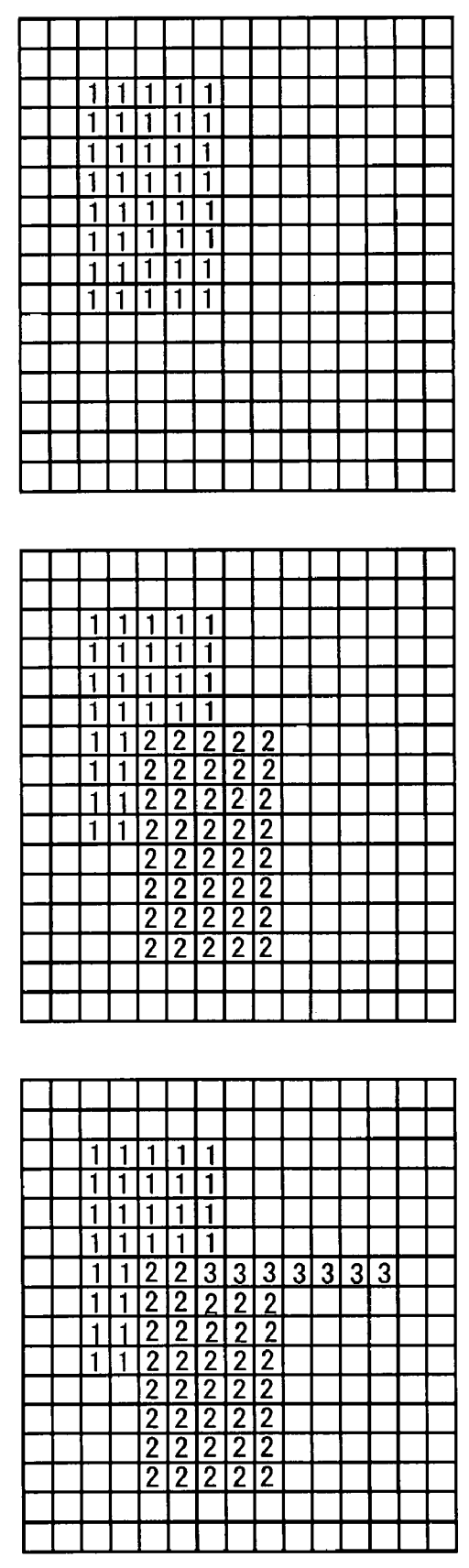

In the example shown in FIG. 4, the ID rendering is first performed on the halftone tint 41. This leads to a rendering result as shown in FIG. 5A. Next, the ID rendering is performed on the image 42. At this time, as for pixels in the area where the halftone tint 41 overlaps with the image 42, the ID of the halftone tint 41 is overwritten by the ID of the image 42. This leads to a rendering result as shown in FIG. 5B. Furthermore, the ID rendering is performed on the stroke 43. At this time also, the ID of the halftone tint 41 and the ID of the image 42 are overwritten. This leads to a rendering result as shown in FIG. 5C. Thus, the ID rendering process is completed.

Figure 6:
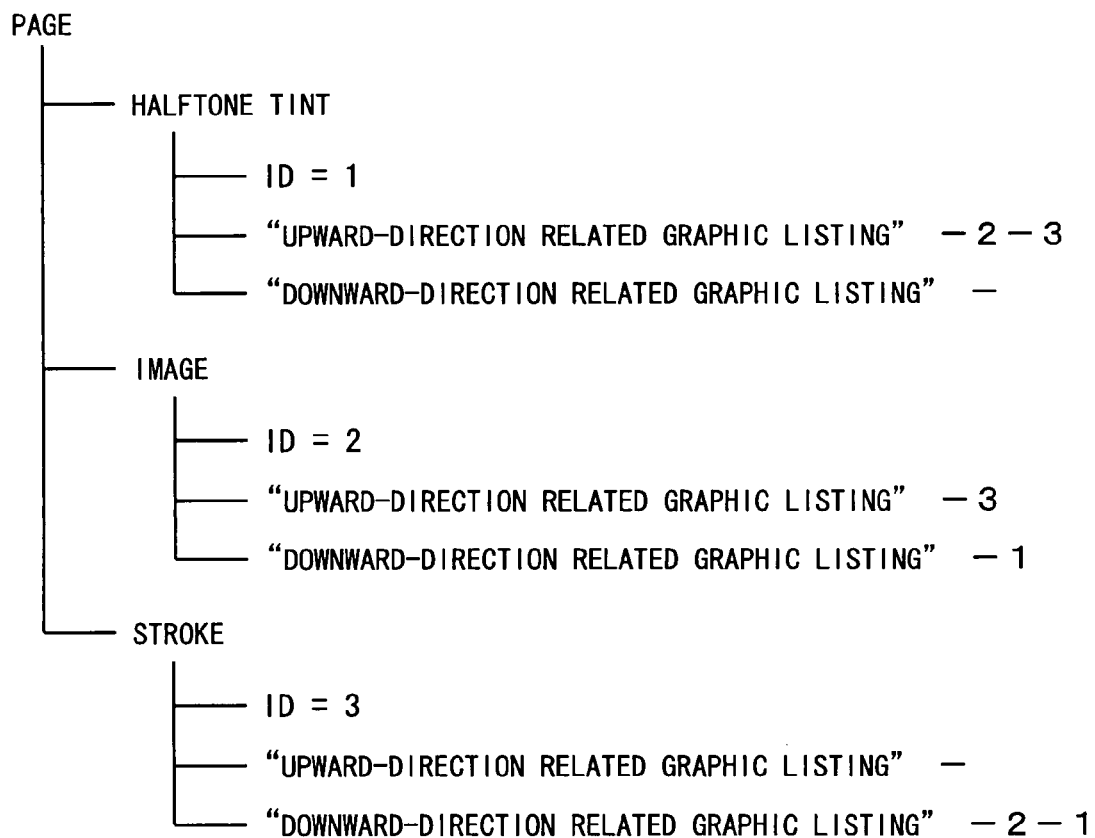
FIG. 6 is a diagram illustrating an exemplary related graphic list in the embodiment.

After the ID rendering process, a list (hereinafter, referred to as a "related graphic list") that indicates overlapping of the objects (relative positional relationships in the vertical direction) is generated based on the ID rendering result obtained in step S120 (step S130). FIG. 6 is a diagram schematically illustrating a related graphic list generated in the example shown in FIG. 4. As shown in FIG. 6, an upward-direction related graphic listing and a downward-direction related graphic listing are generated for each object within the page. The related graphic list is generated in the following manner based on the rendering results shown in FIG. 5C.

First, each pixel within the display area is scanned, focusing on "ID=1". In this case, if an ID other than "1" is rendered for any pixel adjacent to a pixel for which "1" is rendered, the ID is added to the upward-direction related graphic listing. In FIG. 5C, "1" is adjacent to "2" and "3", and therefore "2" and "3" are added to the upward-direction related graphic listing for the graphic object with "ID=1" as shown in FIG. 6.

Next, each pixel within the display area is scanned, focusing on "ID=2". In this case, when an ID other than "2" is rendered for any pixel adjacent to a pixel for which "2" is rendered, the ID is added to the downward-direction related graphic listing if the ID has a value less than "2" or to the upward-direction related graphic listing if more than "2". Accordingly, as shown in FIG. 6, "3" is added to the upward-direction related graphic listing for the object with "ID=2", and "1" is added to the downward-direction related graphic listing for the object with "ID=2". Furthermore, a similar operation is performed for "ID=3". As such, the related graphic list as shown in FIG. 6 is generated. After the generation of the related graphic list, the procedure advances to step S140.

In step S140, a trap rule is applied to all the objects within the page. The "trap rule" as used herein refers to configuration information, which has been previously set for determining the attributes (color, width, trap direction, etc.) of a trap graphic. In addition, the "application of the trap rule" is to determine (set) the attributes for each trap graphic that is to be generated, in accordance with the trap rule. In the present embodiment, for any trap graphic that is to be generated between objects including an image, the trap direction is set to "automatic".

In step S150, whether the trap direction is set at "automatic" is determined for each trap graphic to be generated. If the determination result is that the trap direction is set at "automatic", the procedure advances to step S160. On the other hand, if the trap direction is not set at "automatic", the procedure advances to step S200, and then to step S210 after normal processing is performed.

Figure 7A:
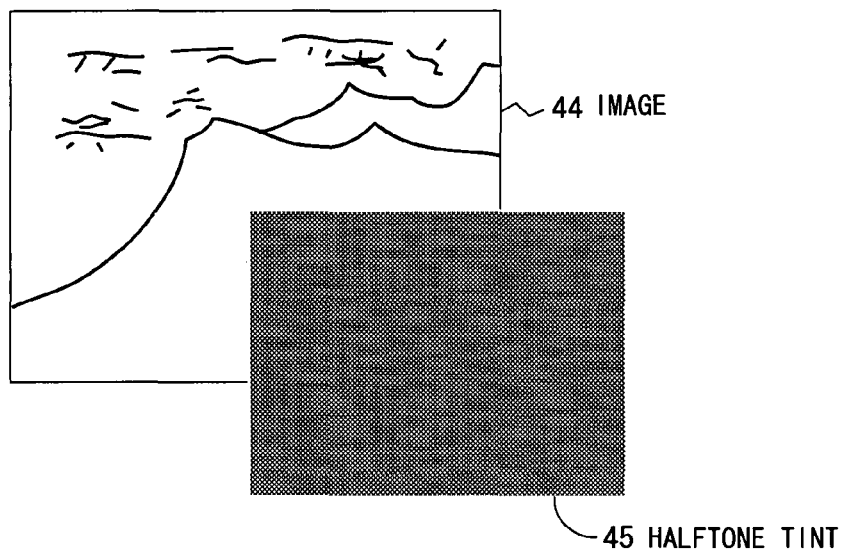
FIGS. 7A and 7B are diagrams for describing extraction of a neighboring vector between an image and a halftone tint in the embodiment.
Figure 7B:
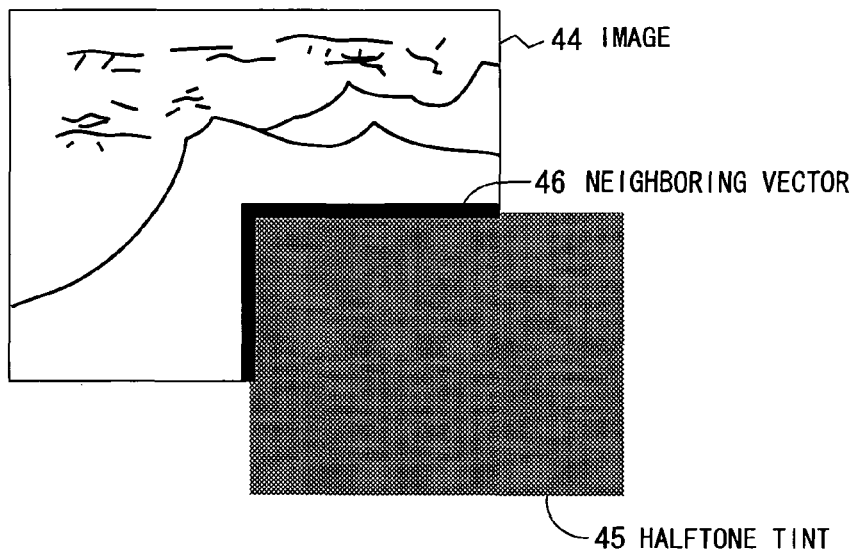
Figure 8A:
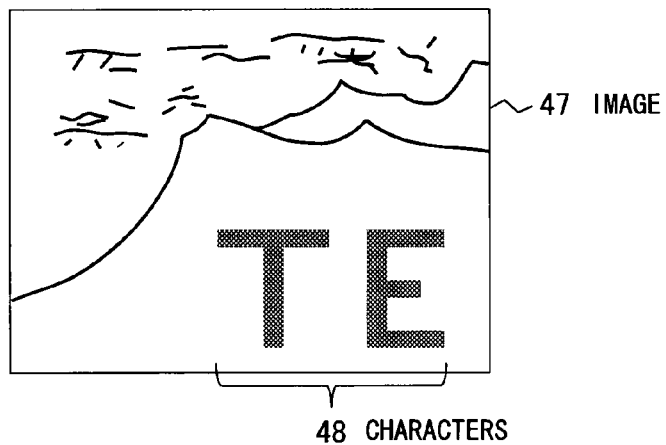
FIGS. 8A and 8B are diagrams for describing extraction of neighboring vectors between an image and characters in the embodiment.
Figure 8B:
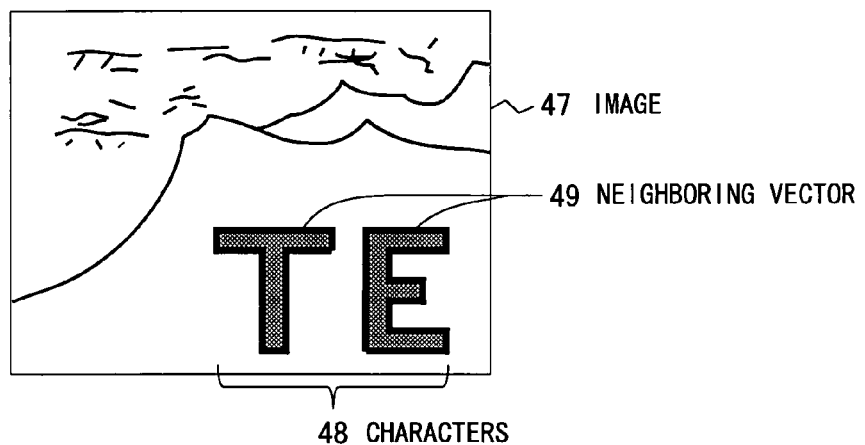

In step S160, a neighboring vector is extracted. For example, in the case where a halftone tint 45 is disposed on an image 44 as shown in FIG. 7A, a portion of the contour of the halftone tint 45 that is included in the area of the image 44 is extracted as a neighboring vector 46 as shown in FIG. 7B. In addition, in the case where characters "TE" denoted by 48 are disposed on an image 47 so as to be entirely included in the area of the image 47 as shown in FIG. 8A, the contours of the characters 48 are entirely extracted as neighboring vectors 49 as shown in FIG. 8B.

Incidentally, at the time of extracting the neighboring vector in step S160, the graphic path direction is corrected, for example, such that the left side of the graphic boundary of each object is the inside of the object, and the right side is the outside of the object. This will be described with reference to FIGS. 9A to 9C, as well as FIGS. 10A and 10B.

Figure 9A:
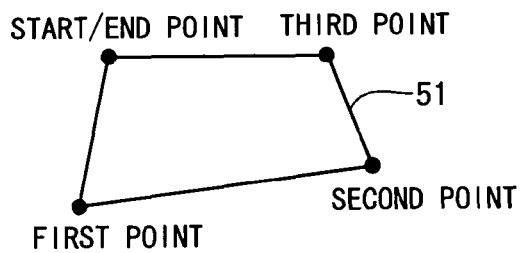
FIGS. 9A to 9C are diagrams for describing path direction correction for a graphic in the embodiment.
Figure 9B:
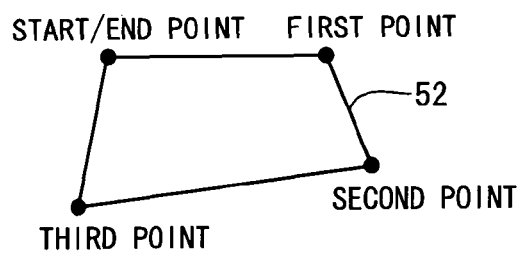
Figure 9C:
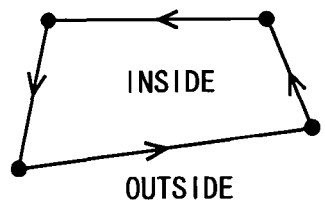

When there is an object 51 rendered counterclockwise (leftward) as shown in FIG. 9A, and the contour traces a "start/end point", a "first point", a "second point", a "third point", and the "start/end point" in this order, the left side of the contour is the inside of the object 51, and the right side is the outside of the object 51. On the other hand, when there is an object 52 rendered clockwise (rightward) as shown in FIG. 9B, and the contour traces a "start/end point", a "first point", a "second point", a "third point", and the "start/end point" in this order, the right side of the contour is the inside of the object 52, and the left side is the outside of the object 52. In the present embodiment, which object includes coordinate points is determined in step S190 to be described later, in accordance with which side of the neighboring vector the coordinate points belong. Accordingly, in order to allow every set of coordinate points to be arranged counterclockwise, internal data for the object 52 rendered clockwise as shown in FIG. 9B is corrected such that the graphic path direction is reversed, i.e., the coordinate points are arranged as shown in FIG. 9A. This makes it possible to determine that coordinate points on the left side of the contour of an object are inside the object, and coordinate points on the right side are outside the object as shown in FIG. 9C.

Figure 10A:
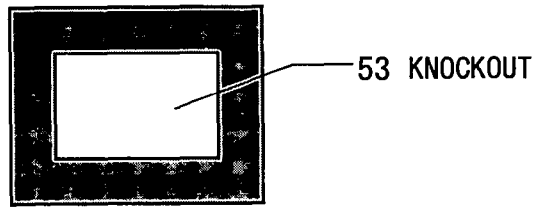
FIGS. 10A and 10B are diagrams for describing path direction correction for a graphic having been subjected to a "knockout" process in the embodiment.
Figure 10B:
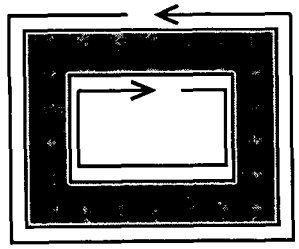

In addition, if there is an object including a graphic 53 having been subjected to a process called "knockout" as shown in FIG. 10A, the internal data is corrected for the aforementioned determination, such that coordinate points for the external contour are arranged counterclockwise, and coordinate points for the internal contour are arranged clockwise, as shown in FIG. 10B.

After the neighboring vector is extracted, the procedure advances to step S170. In step S170, sample points are extracted. The sample points as used herein refer to coordinate points extracted for calculating average brightness in the vicinity of a neighboring vector for two overlapping objects as a luminance level. The sample points are extracted based on, for example, coordinate points on a neighboring vector (or coordinates at each point therein), the number of coordinate points that are to be extracted as sample points (hereinafter, the number of coordinate points that are to be extracted as sample points and present on one object is referred to as a "sample point count"), and the distances between the sample points and the neighboring vector. Note that the sample point count is preset for each system or designated by the user. In addition, the distances between the sample points and the neighboring vector are determined based on the width of a trap graphic, and the resolution for the rendering process to be described later.

Figure 11A:
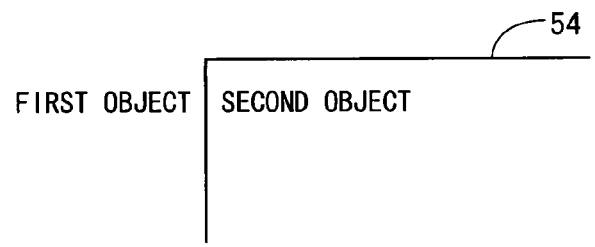
FIGS. 11A to 11D are diagrams for describing an exemplary sample point extraction method in the embodiment, where coordinates at a start point of the neighboring vector are different from those at an end point.

FIGS. 11A to 11D are diagrams for describing an example of the methods for extracting the sample points where coordinates at the start point of the neighboring vector are different from those at the end point. The following description is given based on the assumption that there is a neighboring vector 54 between a first object and a second object as shown in FIG. 11A, and the sample point count is set at "4".

Figure 11B:
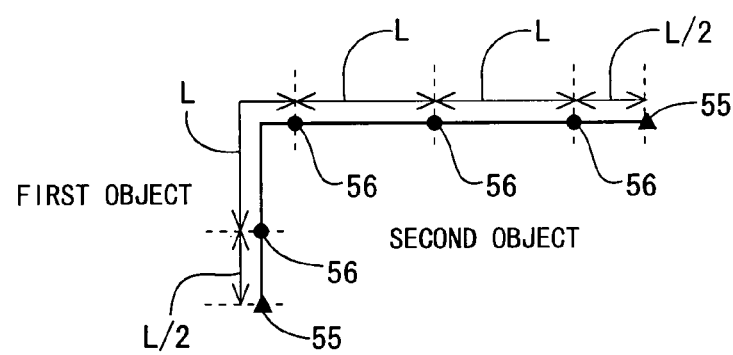
Figure 11C:
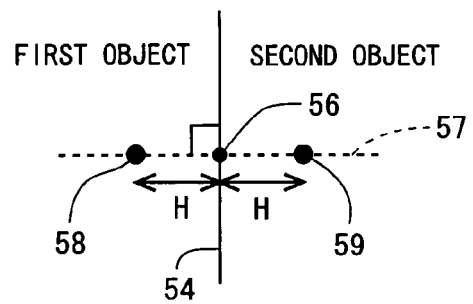
Figure 11D:
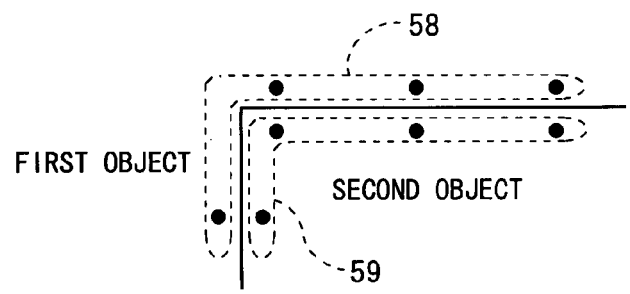

First, assuming that the entire length of the neighboring vector 54 is 4 L as shown in FIG. 11B, four points (coordinate points) 56 are extracted such that the distance between each pair of adjacent points on the neighboring vector 54 is L, and the distance between the point nearest to an edge point 55 and the edge point 55 is L/2. Reference coordinate points for sample coordinate extraction are implemented by the four points 56. Next, (coordinate) points that are to be used as the sample points are extracted for each of the first and second objects based on the extracted points 56. At this time, as shown in FIG. 11C, a line 57 perpendicular to the neighboring vector 54 is drawn from each of the extracted points 56 as described above, and coordinate points on the perpendicular line 57 are acquired such that the distance from the point 56 is equal to distance H that is determined based on the width of the trap graphic and the resolution for the rendering process to be described later. In this manner, a sample point 58 on the first object side and a sample point 59 on the second object side are extracted as shown in FIG. 11D.

Note that when both the first object and the second object are images, the sample points must be extracted for each of the two objects, but when only one of them is an image, the sample points may be extracted only for that image object.

Figure 12A:
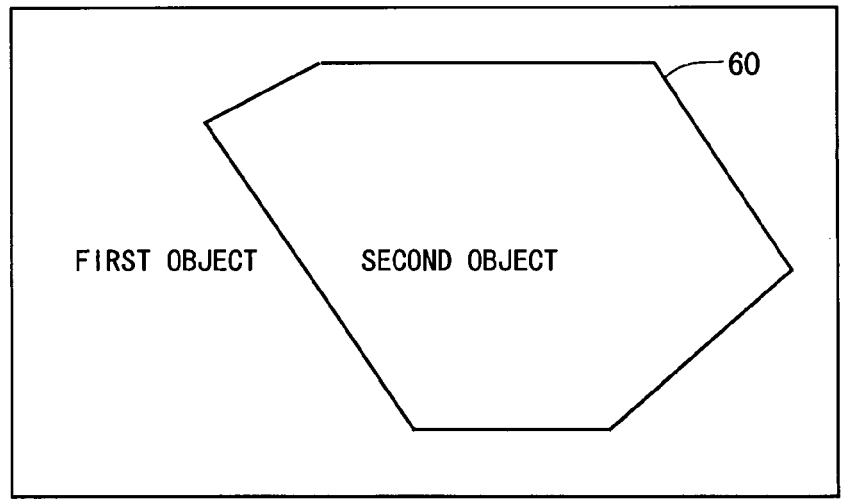
FIGS. 12A to 12C are diagrams for describing another exemplary sample point extraction method in the embodiment, where the coordinates at the start point of the neighboring vector are the same as those at the end point.
Figure 12B:
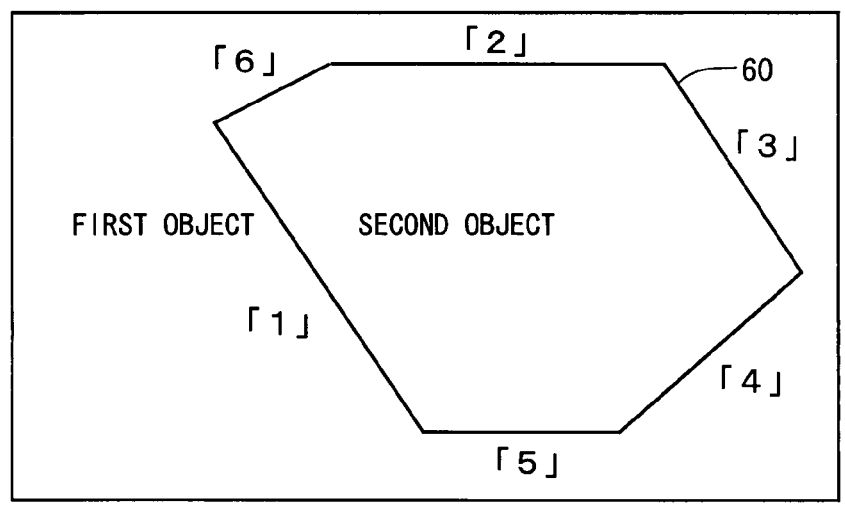
Figure 12C:
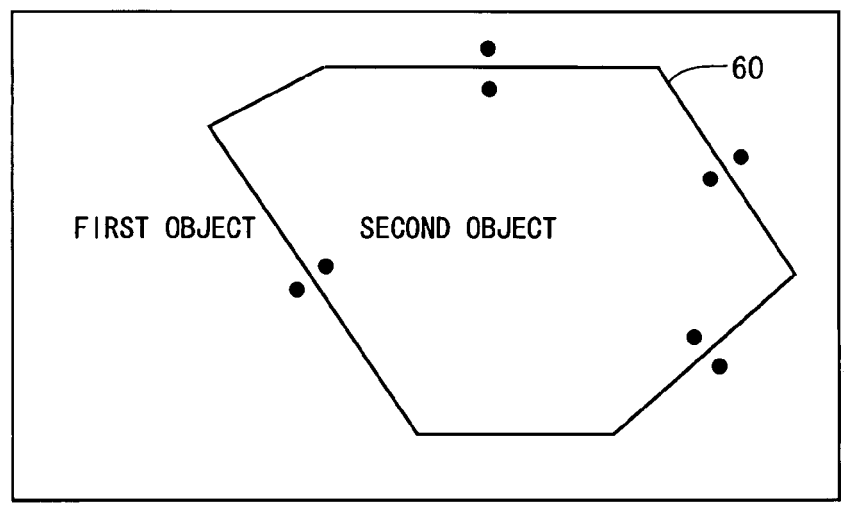

FIGS. 12A to 12C are diagrams for describing an example of the methods for extracting the sample points where the coordinates at the start point of the neighboring vector are the same as those at the end point. The following description is given based on the assumption that the area of a first object includes the area of a second object as shown in FIG. 12A, and the sample point count is set at "4".

First, the length of each line segment of a neighboring vector 60 is calculated. Thereafter, coordinates at a midpoint (a reference coordinate point for sample coordinate extraction) are acquired for each of the four longest line segments. A line perpendicular to the neighboring vector 60 is drawn from the acquired midpoint as described above, and coordinate points on the perpendicular line are acquired such that their distances from the midpoint are equal to a distance determined based on the width of the trap graphic and the resolution for the rendering process to be described later. For example, when the order in length of the line segments (the order from the longest to the shortest line segment) is as shown in FIG. 12B, the sample points are extracted as shown in FIG. 12C.

Note that instead of first acquiring the coordinates at the midpoints of the four longest line segments, the coordinates at the midpoint of the longest line segment may be acquired first, after which are acquired coordinates at the midpoint of the longest line segment from among all other line segments, which include line segments obtained by dividing the longest of the four longest line segments at the acquired midpoint. Such a process for re-acquiring coordinates at the midpoint of the longest line segment is repeated to extract four sample points.

Figure 13A:
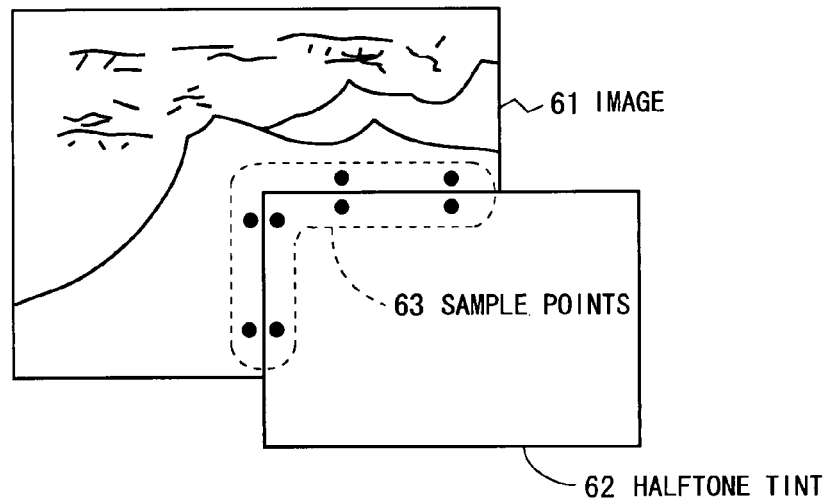
FIGS. 13A and 13B are diagrams for describing a rendering process for acquiring color values at sample points in the embodiment.
Figure 13B:
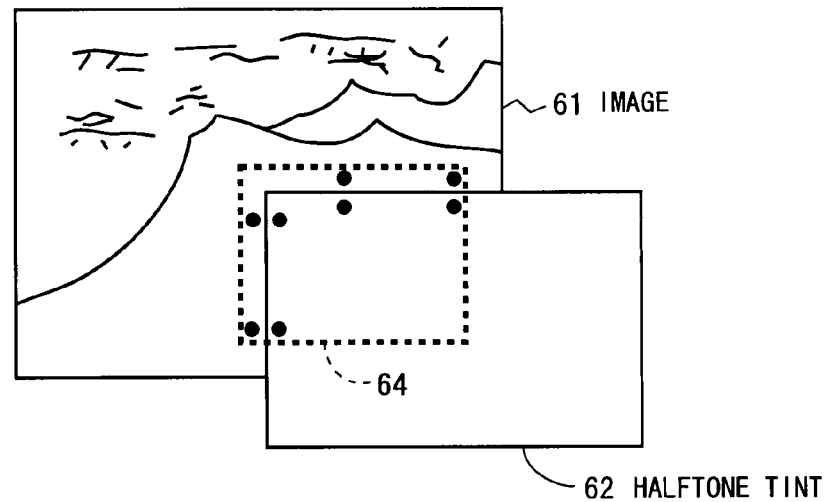

After the extraction of the sample points, the procedure advances to step S180. In step S180, color values at the sample points are acquired. The color values at the sample points are acquired by rendering a rectangular area including all the sample points in the smallest possible size with a predetermined resolution. For example, when sample points 63 are extracted as shown in FIG. 13A, a rendering process (a RIP process) is performed on a rectangular area 64 as shown in FIG. 13B. By this rendering process, the color value is acquired for each sample point. Note that the reason why the rendering process is required for acquiring the color values at the sample points (the reason why the color values cannot be acquired based on object data) is because the actual color value at each coordinate point is determined by performing the rendering process based on page data and page layout information.

In step S190, the trap direction between objects at least one of which includes an image is determined. The trap direction is determined by comparing an average color value among sample points on the left side of a neighboring vector to an average color value among sample points on the right side. Specifically, the average color value is calculated per plate for each object, and the calculated averages (of the plates) are substituted into the following equation (1) to calculate luminance level L.

$$L=100-(0.3 \times C+0.59 \times M+0.11 \times Y+K) \quad (1)$$

where C is the average color value for the C plate, M is the average color value for the M plate, Y is the average color value for the Y plate, and K is the average color value for the K plate.

After the luminance level L is calculated for each object (the objects on both sides of the neighboring vector) in the manner as described above, the trap direction is determined in the following manner. Note that when the objects on both sides of the neighboring vector are both images, the luminance levels of the objects must both be calculated by the above equation (1) but when one of the objects is a color object, the luminance level of the color object may be acquired based on the attributes of the color object, rather than by the above equation (1). For example, when a halftone tint 62 is disposed on an image 61 as shown in FIG. 13A, only the luminance level of the image 61 may be acquired by the above equation (1).

When the luminance level of the object on the left side of the neighboring vector is lower than that of the object on the right side, a determination is made to generate the trap graphic on the object present on the left side of the neighboring vector. On the other hand, when the luminance level of the object on the left side of the neighboring vector is higher than that of the object on the right side, a determination is made to generate the trap graphic on the object present on the right side of the neighboring vector. In addition, when the two objects have the same luminance level, a determination is made to generate the trap graphic centering around the neighboring vector.

Figure 14A:
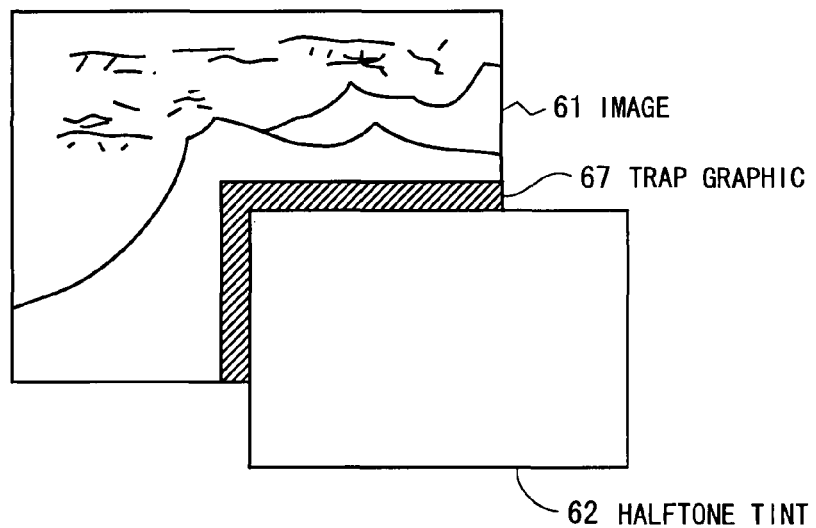
FIGS. 14A to 14C are diagrams for describing trap direction determination in the embodiment.
Figure 14B:
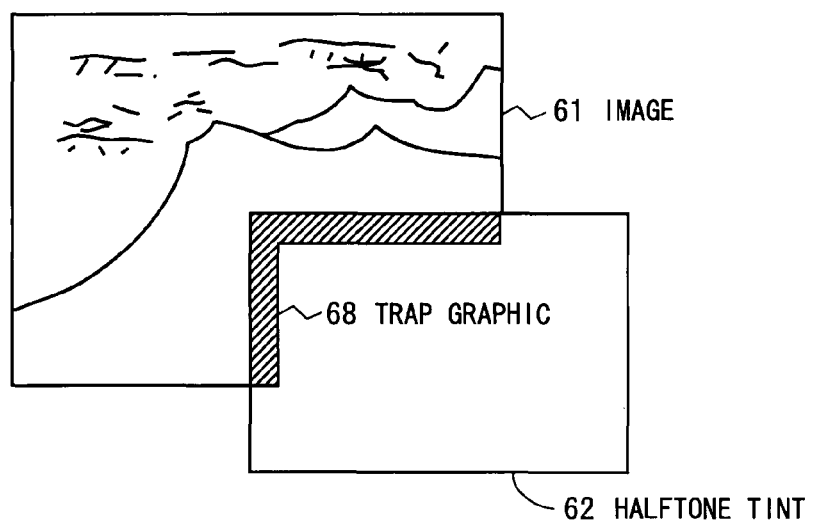
Figure 14C:
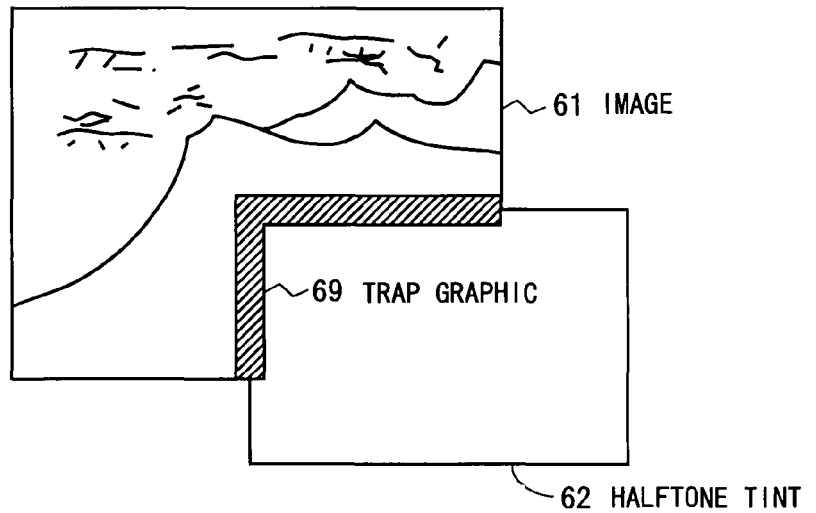
Figure 16A:
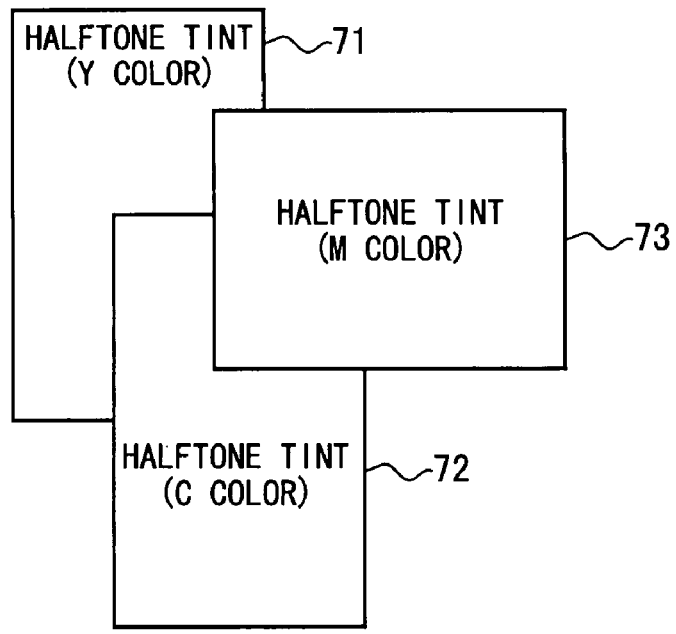
FIGS. 16A and 16B are diagrams for describing trap graphics in the conventional art.
Figure 16B:
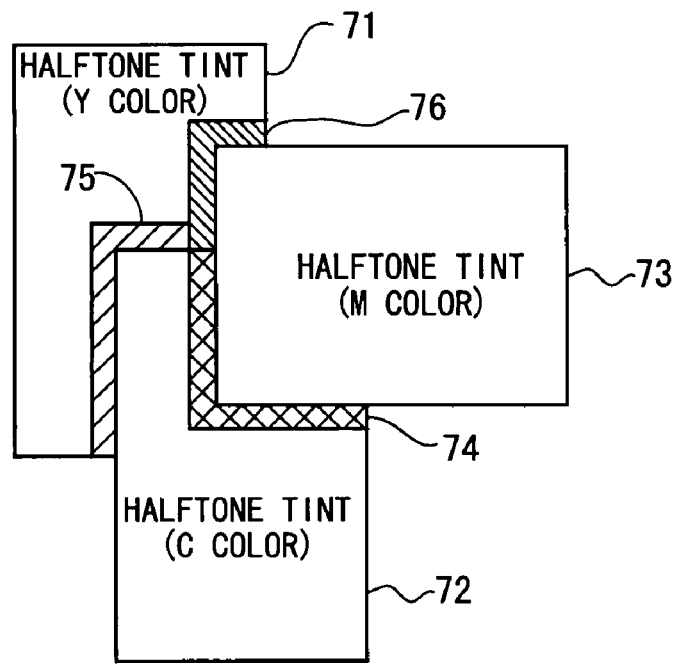
Figure 17A:
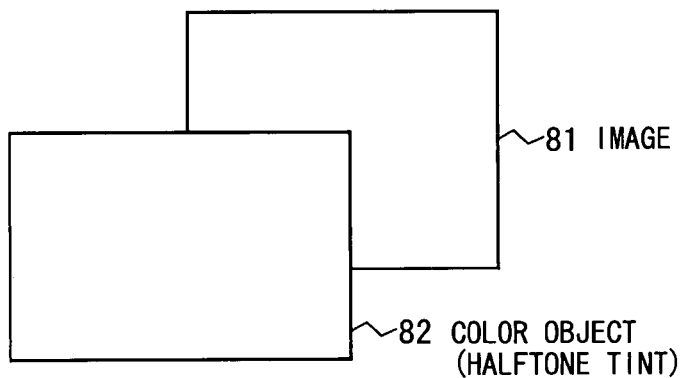
FIGS. 17A to 17D are diagrams for describing trap directions in a conventional example.
Figure 17B:
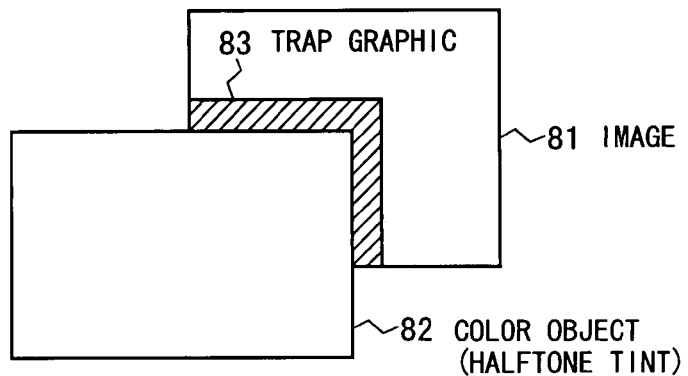
Figure 17C:
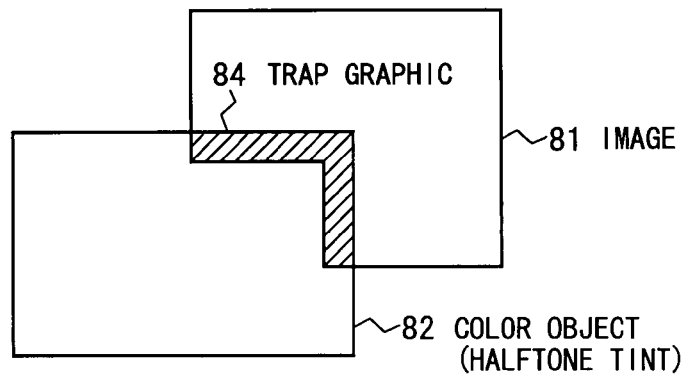
Figure 17D:
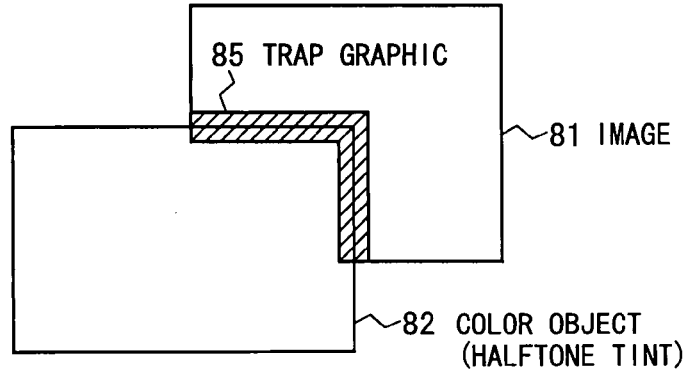
Figure 18A:
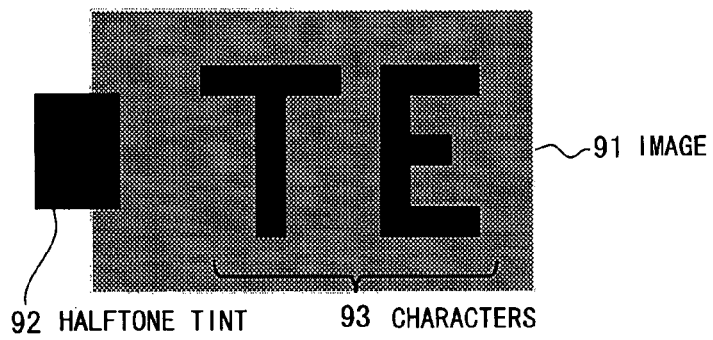
FIGS. 18A and 18B are diagrams for describing exemplary results for a trapping process performed in accordance with the trap rule "increase in area of color object relative to image" in the conventional example.
Figure 18B:
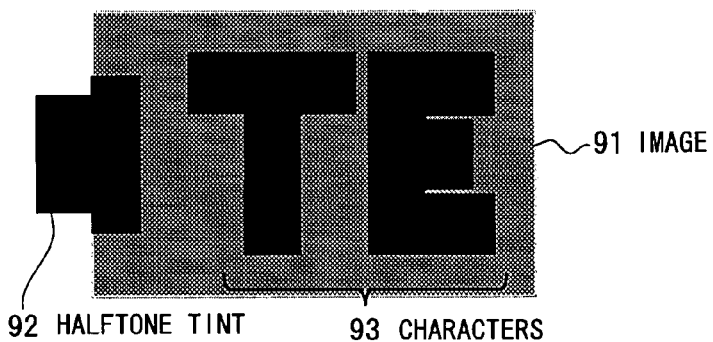
Figure 19A:
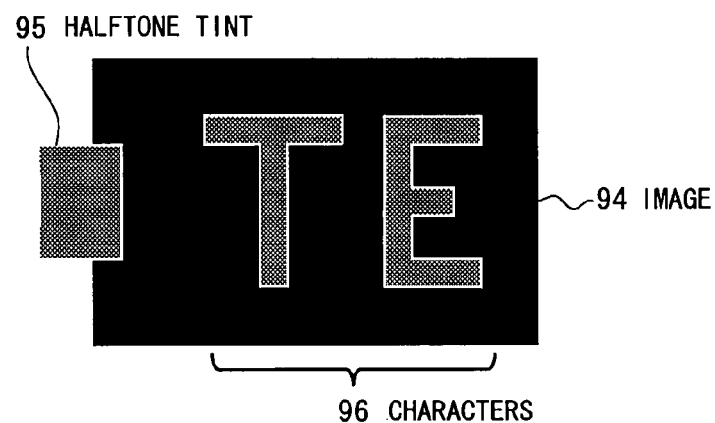
FIGS. 19A and 19B are diagrams for describing exemplary results for a trapping process performed in accordance with the trap rule "decrease in area of color object relative to image" in the conventional example.
Figure 19B:
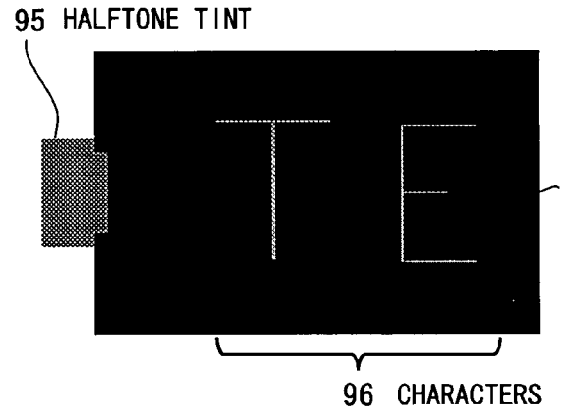

For example, in the example shown in FIG. 13A, if the luminance level of the image 61 is lower than that of the halftone tint 62, i.e., the halftone tint 62 is brighter than the image 61, a determination is made to generate a trap graphic 67 on the image 61 side as shown in FIG. 14A. On the other hand, if the luminance level of the image 61 is higher than that of the halftone tint 62, i.e., the image 61 is brighter than the halftone tint 62, a determination is made to generate a trap graphic 68 on the halftone tint 62 side as shown in FIG. 14B. In addition, if the image 61 and the halftone tint 62 have the same luminance level, i.e., the image 61 and the halftone tint 62 have the same brightness, a determination is made to generate a trap graphic 69 centering around the neighboring vector as shown in FIG. 14C.

When the trap direction between the objects including an image is determined, the procedure advances to step S210. In step S210, the trap graphic is outputted for all objects within the page. Thereafter, data conversion is performed in accordance with the format of page data which is output data (step S220) and the page data that has been subjected to the trapping process is outputted to the auxiliary storage device 20 (step S230). Thus, the image processing for the trapping process is completed.

Note that in the present embodiment, a sample coordinate extraction portion/step is implemented by step S170, a color value acquisition portion/step is implemented by step S180, and a trap graphic generation position (TGGP) determination portion/step is implemented by step S190.

<4. Effect>

According to the present embodiment, the image processing for the trapping process includes: a process for extracting a predetermined number of coordinate points (sample points) in the vicinity of a neighboring vector, which is a boundary between objects; a process for acquiring color values at the extracted sample points; and a process for calculating luminance levels of the objects based on the color values at the sample points, and comparing the luminance levels with each other to determine a trap direction. Accordingly, even if one of two overlapping objects is an image, average brightness of the image in the vicinity of the neighboring vector is calculated as the luminance level. Therefore, when generating a trap graphic between images or between an image and a color object, the trap direction can be determined based on the brightness of the two objects, rather than a predesignated trap rule. As a result, even if an image contains color objects with various levels of brightness, the trap graphic is generated in a desirable trap direction between the objects. Thus, the burden of manual correction, etc., on the user is lessened, resulting in efficient processing.

<5. Variant>

In the above embodiment, if there is any slight difference in luminance level between the object on the left side of the neighboring vector and the object on the right side, the trap graphic is generated on the object with a lower luminance level, but the present invention is not limited thereto. When the difference in luminance level between the two objects is relatively small, it might be desirable to generate the trap graphic centering around the neighboring vector, rather than on one object. Therefore, a menu (a dialog or suchlike) may be provided as a value entry portion for the user to enter the difference in luminance level, so that if the difference in luminance level between the two objects is less than or equal to the value entered by the user, a determination is made to generate the trap graphic centering around the neighboring vector.

Figures 15A, 15B, 15C:
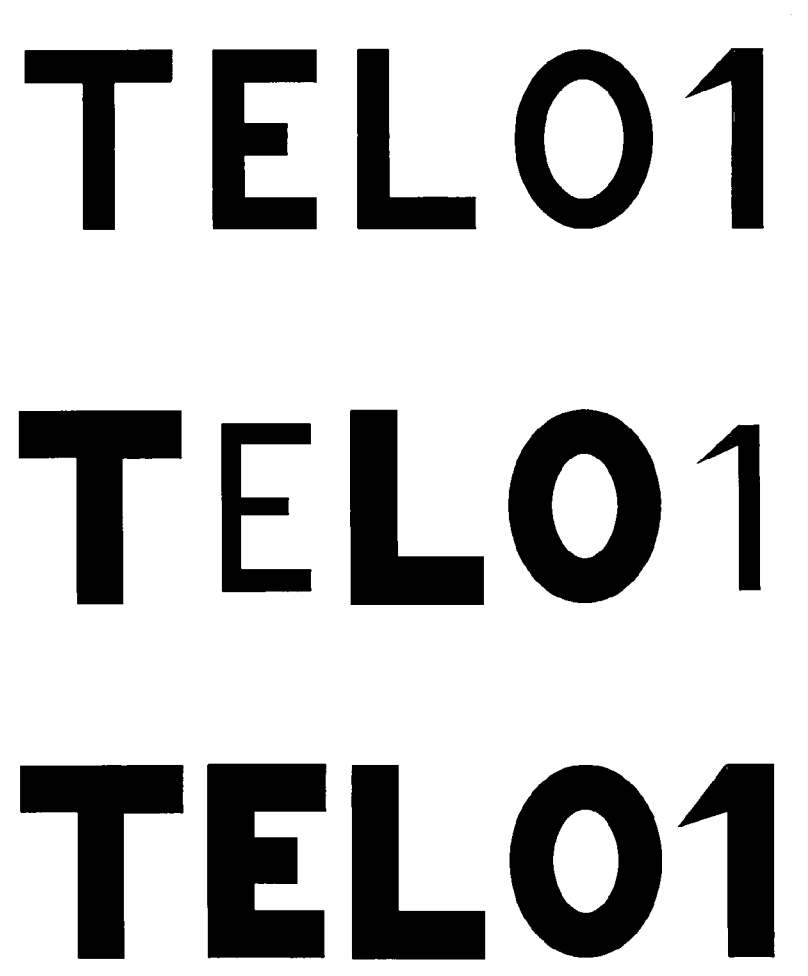

In addition, when a character string consisting of a plurality of characters is disposed on an image as a color object, it might be desirable to determine the trap direction per character string, rather than per character. The following description is given, for example, on the assumption that a character string as shown in FIG. 15A is disposed on an image. In this case, if the trap direction is determined per character, for example, the trap direction might vary from one character to another as shown in FIG. 15B, so that the trap graphic is generated in a manner undesirable to the user. Therefore, a menu (a dialog or suchlike) may be provided as a selection portion for the user to select the trap direction per character or per character string, so that the method for determining the trap direction for the character string can be changed based on the result of the user selection. Thus, if the selection is made to determine the trap direction per character string, for example, all characters in the character string can have the same trap direction as shown in FIG. 15C.

Note that examples of the method for determining the trap direction per character string include a trap direction determination method in which any character at a luminance level less than or equal to the level designated by the user is "decreased in area relative to the image" regardless of the luminance level of the image; and a trap direction determination method in which the user designates a plate and a color value, and any character for which the actual color value of the designated plate is equal to or more than the color value designated by the user is "decreased in area relative to the image" regardless of the luminance level of the image.

Furthermore, the sample point extraction methods are not limited to those described in the above embodiment, and other methods are applicable so long as average brightness in the vicinity of the neighboring vector can be obtained for each object.

While the invention has been described in detail, the foregoing description is in all aspects illustrative and not restrictive. It is understood that numerous other modifications and variations can be devised without departing from the scope of the invention.

Note that the present application claims priority to Japanese Patent Application No. 2006-352243, titled "IMAGE PROCESSING APPARATUS AND PROGRAM FOR PRINTING AND PLATE MAKING", filed on Dec. 27, 2006, which is incorporated herein by reference.

What is claimed is:

1. An image processing apparatus for reading print data containing a plurality of objects including image objects each having one or more colors and color objects each having one color, and generating a trap graphic along a neighboring vector, which is a boundary portion between any two overlapping objects from among the plurality of objects, the boundary portion being included in a contour of one of the two overlapping objects that is disposed on top of the other overlapping object, the apparatus comprising:
a sample coordinate extraction portion for extracting coordinate points in the vicinity of the neighboring vector as sample coordinate points from among all coordinate points at which the image object is rendered, wherein at least one of the two overlapping objects is an image object;
a color value acquisition portion for acquiring color values representing colors at the sample coordinate points; and
a trap graphic generation position (TGGP) determination portion for determining a position in which to generate the trap graphic with reference to the neighboring vector, based on the color values at the sample coordinate points acquired by the color value acquisition portion,
wherein the color value acquisition portion acquires the color values at the sample coordinate points by rendering a rectangular area in the smallest possible size, the rectangular area containing all the sample coordinate points extracted by the sample coordinate extraction portion.

2. An image processing apparatus for reading print data containing a plurality of objects including image objects each having one or more colors and color objects each having one color, and generating a trap graphic along a neighboring vector, which is a boundary portion between any two overlapping objects from among the plurality of objects, the boundary portion being included in a contour of one of the two overlapping objects that is disposed on top of the other overlapping object, the apparatus comprising:
a sample coordinate extraction portion for extracting coordinate points in the vicinity of the neighboring vector as sample coordinate points from among all coordinate points at which the image object is rendered wherein at least one of the two overlapping objects is an image object;
a color value acquisition portion for acquiring color values representing colors at the sample coordinate points; and
a trap graphic generation position (TGGP) determination portion for determining a position in which to generate the trap graphic with reference to the neighboring vector, based on the color values at the sample coordinate points acquired by the color value acquisition portion,
wherein:
the sample coordinate extraction portion extracts a predetermined number of coordinate points from among all coordinate points on the neighboring vector as reference coordinate points for sample coordinate extraction, which are referenced for extracting the sample coordinate points, and
the sample coordinate extraction portion extracts predetermined points as the sample coordinate points, the predetermined points being present on a line that is perpendicular to the neighboring vector and extends through the reference coordinate points for sample coordinate extraction.

3. The image processing apparatus according to claim 2, wherein the sample coordinate extraction portion extracts the reference coordinate points for sample coordinate extraction, such that adjacent pairs of the reference coordinate points for sample coordinate extraction on the neighboring vector are equally distanced from each other.

4. The image processing apparatus according to claim 2, wherein the sample coordinate extraction portion extracts coordinate points at the middle of a line segment as the reference coordinate points for sample coordinate extraction, the line segment being relatively long among all line segments representing the boundary portion constituting the neighboring vector.

5. An image processing apparatus for reading print data containing a plurality of objects including image objects each having one or more colors and color objects each having one color, and generating a trap graphic along a neighboring vector, which is a boundary portion between any two overlapping objects from among the plurality of objects, the boundary portion being included in a contour of one of the two overlapping objects that is disposed on top of the other overlapping object, the apparatus comprising:
a sample coordinate extraction portion for extracting coordinate points in the vicinity of the neighboring vector as sample coordinate points from among all coordinate points at which the image object is rendered, wherein at least one of the two overlapping objects is an image object;
a color value acquisition portion for acquiring color values representing colors at the sample coordinate points; and
a trap graphic generation position (TGGP) determination portion for determining a position in which to generate the trap graphic with reference to the neighboring vector, based on the color values at the sample coordinate points acquired by the color value acquisition portion, wherein the TGGP determination portion calculates luminance levels of the image objects based on the color values at the sample coordinate points acquired by the color value acquisition portion, and determines the position in which to generate the trap graphic with reference to the neighboring vector, such that the trap graphic is generated on one of the two overlapping objects that has a lower luminance level.

6. The image processing apparatus according to claim 5, further comprising a value entry portion for accepting external value entry, wherein the TGGP determination portion determines to generate the trap graphic so as to center around the neighboring vector when a difference in luminance level between the two overlapping objects is less than or equal to a value entered through the value entry portion.

7. An image processing apparatus for reading print data containing a plurality of objects including image objects each having one or more colors and color objects each having one color, and generating a trap graphic along a neighboring vector, which is a boundary portion between any two overlapping objects from among the plurality of objects, the boundary portion being included in a contour of one of the two overlapping objects that is disposed on top of the other overlapping object, the apparatus comprising:

a sample coordinate extraction portion for extracting coordinate points in the vicinity of the neighboring vector as sample coordinate points from among all coordinate points at which the image object is rendered, wherein at least one of the two overlapping objects is an image object;

a color value acquisition portion for acquiring color values representing colors at the sample coordinate points;

a trap graphic generation position (TGGP) determination portion for determining a position in which to generate the trap graphic with reference to the neighboring vector, based on the color values at the sample coordinate points acquired by the color value acquisition portion; and a selection portion for externally selecting whether to determine the position in which to generate the trap graphic per character or per character string when one of the two overlapping objects is a color object including a character string consisting of a plurality of characters, wherein:

for the character string consisting of the plurality of characters, the TGGP determination portion determines the position in which to generate the trap graphic per character when the selection portion selects a determination per character, and for the character string consisting of the plurality of characters, the TGGP determination portion determines the position in which to generate the trap graphic when the selection portion selects a determination per character string such that a relative positional relationship between the neighboring vector and the trap graphic is identical among all the plurality of characters.

8. A non-transitory computer-readable recording medium having therein an image processing program for use with an image processing apparatus for reading print data containing a plurality of objects including image objects each having one or more colors and color objects each having one color, and generating a trap graphic along a neighboring vector, which is a boundary portion between any two overlapping objects from among the plurality of objects, the boundary portion being included in a contour of one of the two overlapping objects that is disposed on top of the other overlapping object, the execution of the image processing program causing the apparatus to perform the following steps:

a sample coordinate extraction step for extracting coordinate points in the vicinity of the neighboring vector as sample coordinate points from among all coordinate points at which the image object is rendered, wherein at least one of the two overlapping objects is an image object;

a color value acquisition step for acquiring color values representing colors at the sample coordinate points; and a trap graphic generation position (TGGP) determination step for determining a position in which to generate the trap graphic with reference to the neighboring vector, based on the acquired color values at the sample coordinate points in the color value acquisition step, wherein, in the color value acquisition step, the color values at the sample coordinate points are acquired by rendering a rectangular area in the smallest possible size, the rectangular area containing all the sample coordinate points extracted by the sample coordinate extraction step.

9. A non-transitory computer-readable recording medium having therein an image processing program for use with an image processing apparatus for reading print data containing a plurality of objects including image objects each having one or more colors and color objects each having one color, and generating a trap graphic along a neighboring vector, which is a boundary portion between any two overlapping objects from among the plurality of objects, the boundary portion being included in a contour of one of the two overlapping objects that is disposed on top of the other overlapping object, the execution of the image processing program causing the apparatus to perform the following steps:

a sample coordinate extraction step for extracting coordinate points in the vicinity of the neighboring vector as sample coordinate points from among all coordinate points at which the image object is rendered, wherein at least one of the two overlapping objects is an image object;

a color value acquisition step for acquiring color values representing colors at the sample coordinate points; and a trap graphic generation position (TGGP) determination step for determining a position in which to generate the trap graphic with reference to the neighboring vector, based on the acquired color values at the sample coordinate points in the color value acquisition step, wherein, in the sample coordinate extraction step, a predetermined number of coordinate points from among all coordinate points on the neighboring vector are extracted as reference coordinate points for sample coordinate extraction, which are referenced for extracting the sample coordinate points and predetermined points are extracted as the sample coordinate points, the predetermined points being present on a line that is perpendicular to the neighboring vector and extends through the reference coordinate points for sample coordinate extraction.

10. The non-transitory computer-readable recording medium according to claim 9, wherein, in the sample coordinate extraction step, the reference coordinate points for sample coordinate extraction are extracted such that adjacent pairs of the reference coordinate points for sample coordinate extraction on the neighboring vector are equally distanced from each other.

11. The non-transitory computer-readable recording medium according to claim 9, wherein, in the sample coordinate extraction step, coordinate points at the middle of a line segment are extracted as the reference coordinate points for sample coordinate extraction, the line segment being relatively long among all line segments representing the boundary portion constituting the neighboring vector.

12. A non-transitory computer-readable recording medium having therein an image processing program for use with an image processing apparatus for reading print data containing a plurality of objects including image objects each having one or more colors and color objects each having one color, and generating a trap graphic along a neighboring vector, which is a boundary portion between any two overlapping objects from among the plurality of objects, the boundary portion being included in a contour of one of the two overlapping objects that is disposed on top of the other overlapping object, the execution of the image processing program causes the apparatus to perform the following steps:

a sample coordinate extraction step for extracting coordinate points in the vicinity of the neighboring vector as sample coordinate points from among all coordinate points at which the image object is rendered, wherein at least one of the two overlapping objects is an image object;

a color value acquisition step for acquiring color values representing colors at the sample coordinate points; and a trap graphic generation position (TGGP) determination step for determining n in which to generate the trap graphic with reference to the neighboring vector, based on the acquired color values at the sample coordinate points in the color value acquisition step, wherein, in the TGGP determination step, luminance levels of the image objects are calculated based on the acquired color values at the sample coordinate points in the color value acquisition step, and the position in which to generate the trap graphic with reference to the neighboring vector is determined such that the trap graphic is generated on one of the two overlapping objects that has a lower luminance level.

13. The non-transitory computer-readable recording medium according to claim 12, wherein: the execution of the image processing program further causes the apparatus to perform a value entry step for accepting external value entry, and in the TGGP determination step, a determination is made to generate the trap graphic so as to center around the neighboring vector when a difference in luminance level between the two overlapping objects is less than or equal to a value entered through the value entry portion.

14. A non-transitory computer-readable recording medium having therein an image processing program for use with an image processing apparatus for reading print data containing a plurality of objects including image objects each having one or more colors and color objects each having one color, and generating a trap graphic along a neighboring vector, which is a boundary portion between any two overlapping objects from among the plurality of objects, the boundary portion being included in a contour of one of the two overlapping objects that is disposed on top of the other overlapping object, the execution of the image processing program causes the apparatus to perform the following steps:

a sample coordinate extraction step for extracting coordinate points in the vicinity of the neighboring vector as sample coordinate points from among all coordinate points at which the image object is rendered, wherein at least one of the two overlapping objects is an image object;

a color value acquisition step for acquiring color values representing colors at the sample coordinate points; and a trap graphic generation position (TGGP) determination step for determining a position in which to generate the trap graphic with reference to the neighboring vector, based on the acquired color values at the sample coordinate points in the color value acquisition step, wherein, the execution of the image processing program further causes the apparatus to perform a selection step for externally selecting whether to determine the position in which to generate the trap graphic per character or per character string when one of the two overlapping objects is a color object including a character string consisting of a plurality of characters, in the TGGP determination step, for the character string consisting of the plurality of characters, the position in which to generate the trap graphic is determined per character when a determination per character is made in the selection step, and in the TGGP determination step, for the character string consisting of the plurality of characters, the position in which to generate the trap graphic is determined when a determination per character string is made in the selection step such that a relative positional relationship between the neighboring vector and the trap graphic is identical among all the plurality of characters.

* * * * *